United States Patent [19]

Wensink et al.

[11] Patent Number: 5,431,389
[45] Date of Patent: Jul. 11, 1995

[54] HAND SCANNER SUPPORT AND PAPER GUIDE APPARATUS

[76] Inventors: Gary L. Wensink, 1005 E St. NW., Miami, Okla. 74354; S. Michael Bender, 2837 Skimmer Point Dr. S., Gulfport, Fla. 33707

[21] Appl. No.: 296,435

[22] Filed: Aug. 26, 1994

[51] Int. Cl.6 .............................................. B65H 5/02
[52] U.S. Cl. .................................... 271/273; 271/248; 358/473; 358/496; 358/498
[58] Field of Search ............... 271/248, 272, 273, 274; 358/473, 488, 496, 498

[56] References Cited

U.S. PATENT DOCUMENTS

| | | | |
|---|---|---|---|
| 4,743,974 | 5/1988 | Lockwood | 358/498 X |
| 5,330,173 | 7/1994 | Wensink et al. | 271/240 |

*Primary Examiner*—David H. Bollinger
*Assistant Examiner*—Boris Milef

[57] ABSTRACT

A hand scanner support and paper guide apparatus is provided for mechanically scanning a thin sheet using two scanners originally designed to be hand-held. The apparatus includes a base assembly, a top assembly, and a hinge assembly connecting the base assembly and the top assembly together. The base assembly includes a base housing which includes a planar upper wall which serves as a flat surface along which the thin sheet is moved. A base scanner unit is supported by the base assembly a spaced distance below the planar upper wall as the thin sheet is moved past the base scanner unit. A guide assembly is connected to the base housing for guiding the thin sheet in a straight path as the thin sheet is moved along the planar upper wall. A drive assembly, a portion of which is housed within the base housing, is provided for moving the thin sheet past the base scanner unit. A top scanner unit is supported by the top assembly a spaced distance above the planar lower wall as the thin sheet is moved past the top scanner unit. A pinch roller is supported by the top housing. The pinch roller and the drive roller are positioned opposite each other. The pinch roller is driven by the thin sheet as the thin sheet is pinched between the drive roller and the pinch roller and as the thin sheet is driven by the drive roller.

11 Claims, 5 Drawing Sheets

HAND SCANNER SUPPORT AND PAPER GUIDE APPARATUS

BACKGROUND OF THE INVENTION

1. Field of the Invention

The present invention relates generally to document scanner devices and, more particularly, to support devices especially adapted for supporting a hand scanner.

2. Description of the Prior Art

A hand scanner apparatus is disclosed in U.S. Pat. No. 5,330,173 of Wensink et al. This hand scanner apparatus has a number of advantages relating to providing the versatility and portability of a hand-held scanner and, at the same time, the consistency and reproducability of a mechanical scanner in the same scanning apparatus. There is one deficiency, however, with the apparatus disclosed in U.S. Pat. No. 5,330,173 of Wensink et al. When a two-sided sheet of paper is placed in the device of U.S. Pat. No. 5,330,173 of Wensink et al, only one side of the paper can be scanned. In order to scan the second side of the sheet of paper with the device disclosed in U.S. Pat. No. 5,330,173 of Wensink et al, the sheet of paper must be removed from the device, reversed in orientation, and replaced in the device. In this respect, it would be desirable if a hand scanner apparatus were provided that enabled a two-sided sheet of paper to be scanned with hand scanner apparatus without removing, reorienting, and replacing the paper after one side has been scanned.

The foregoing desired characteristic is provided by the unique hand scanner apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a hand scanner support and paper guide apparatus for mechanically scanning a thin sheet using two scanners originally designed to be hand-held. The apparatus includes a base assembly, a top assembly, and a hinge assembly connecting the base assembly and the top assembly together. The base assembly includes a base housing which includes a planar upper wall which serves as a flat surface along which the thin sheet is moved. A base scanner support assembly is supported by the base housing. A base scanner unit is supported by the base scanner support assembly a spaced distance below the planar upper wall as the thin sheet is moved past the base scanner unit. A guide assembly is connected to the base housing for guiding the thin sheet in a straight path as the thin sheet is moved along the planar upper wall. A drive assembly, a portion of which is housed within the base housing, is provided for moving the thin sheet past the base scanner unit.

The drive assembly includes a first driven, thin-sheet-contacting element and a base slot in the planar upper wall for permitting the first driven, thin-sheet-contacting element to contact and move the thin sheet as it lies on the planar upper wall.

The top assembly includes a top housing which includes a planar lower wall which serves as a flat surface below which the thin sheet is moved. A top scanner support assembly is supported by the top housing. A top scanner unit is supported by the top scanner support assembly a spaced distance above the planar lower wall as the thin sheet is moved past the top scanner unit.

A second driven, thin-sheet-contacting element is supported by the top housing. A top slot in the planar upper wall is provided for permitting the second driven, thin-sheet-contacting element to contact and move the thin sheet as it lies on the planar upper wall. The second driven, thin-sheet-contacting element and the first driven, thin-sheet-contacting element are positioned opposite each other. the second driven, thin-sheet-contacting element is driven by the thin sheet as the thin sheet is pinched between the first driven, thin-sheet-contacting element and the second driven, thin-sheet-contacting element as the thin sheet is driven by the first driven, thin-sheet-contacting element.

The top assembly is adapted to rotate on the hinge assembly around the base assembly between two selectable positions. A closed position is provided for scanning the thin sheet such that the first driven, thin-sheet-contacting element and the second driven, thin-sheet-contacting element are located opposite each other. An open position is provided for placing and removing the base scanner unit in the base housing and for placing and removing the top scanner unit in the top housing.

The first driven, thin-sheet-contacting element is a first roller, and the second driven, thin-sheet-contacting element is a second roller.

The drive assembly includes a power supply for converting AC to DC power. A control and timing circuit assembly is powered by the power supply. An activation switch assembly is supported by the base housing and is electrically connected to the control and timing circuit assembly. A drive motor is electrically connected to the control and timing circuit assembly. The first driven, thin-sheet-contacting element is mechanically driven by the drive motor. The second driven, thin-sheet-contacting element is mechanically driven by the first driven, thin-sheet-contacting element through the thin sheet. A paper sensor is electrically connected to the control and timing circuit assembly.

The top scanner support assembly includes a top scanner receiving slot, in the top assembly, for receiving the top scanner unit, and retention clips, supported by the top assembly, for retaining the top scanner unit within the top scanner receiving slot. The base scanner support assembly includes mounting straps for securing the base scanner unit to the base assembly.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining at least two preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved hand scanner apparatus which has all of the advantages of the prior art and none of the disadvantages.

It is another object of the present invention to provide a new and improved hand scanner apparatus which may be easily and efficiently manufactured and marketed.

It is a further object of the present invention to provide a new and improved hand scanner apparatus which is of durable and reliable construction.

An even further object of the present invention is to provide a new and improved hand scanner apparatus which is susceptible of a low cost of manufacture with regard to both materials and labor, and which accordingly is then susceptible of low prices of sale to the consuming public, thereby making such hand scanner apparatus available to the buying public.

Still yet a further object of the present invention is to provide a new and improved hand scanner apparatus which enables a two-sided sheet of paper to be scanned with hand scanner apparatus without removing, reorienting, and replacing the paper after one side has been scanned.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein.

DESCRIPTION OF THE PREFERRED EMBODIMENTS

With reference to the drawings, a new and improved apparatus for use in connection with hand scanners and embodying the principles and concepts of the present invention now will be described in detail.

The present invention comprises an improvement over the hand scanner apparatus disclosed in U.S. Pat. No. 5,330,173 of Wensink et al the disclosure of which patent hereby is incorporated into and made part of this specification by this reference.

Figure 6:
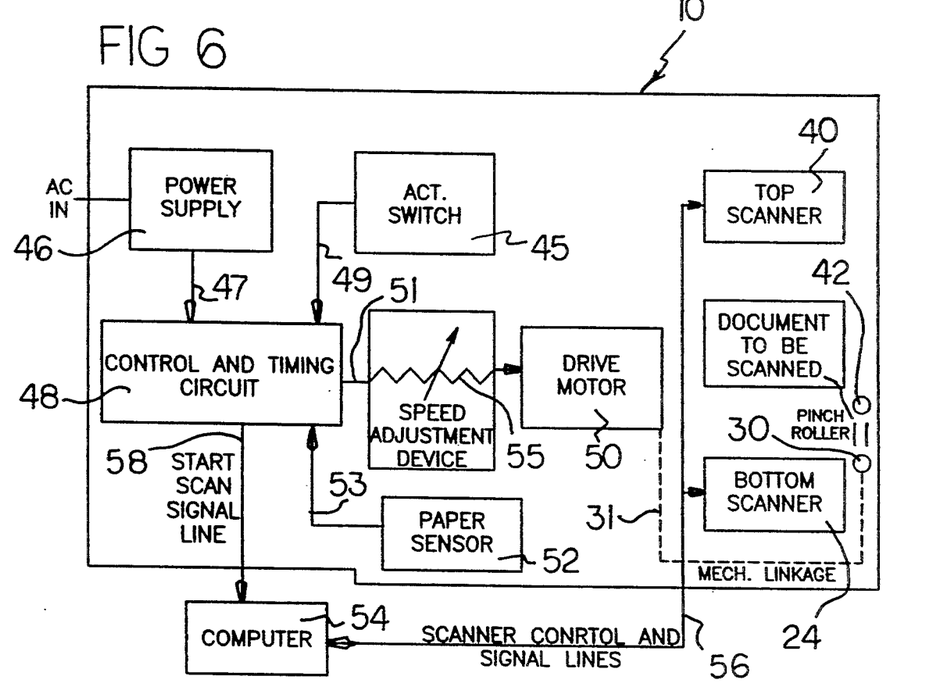
FIG. 6 is an electrical block diagram of circuitry for operating and controlling the embodiment of the invention shown in FIG. 1.
Figure 7:
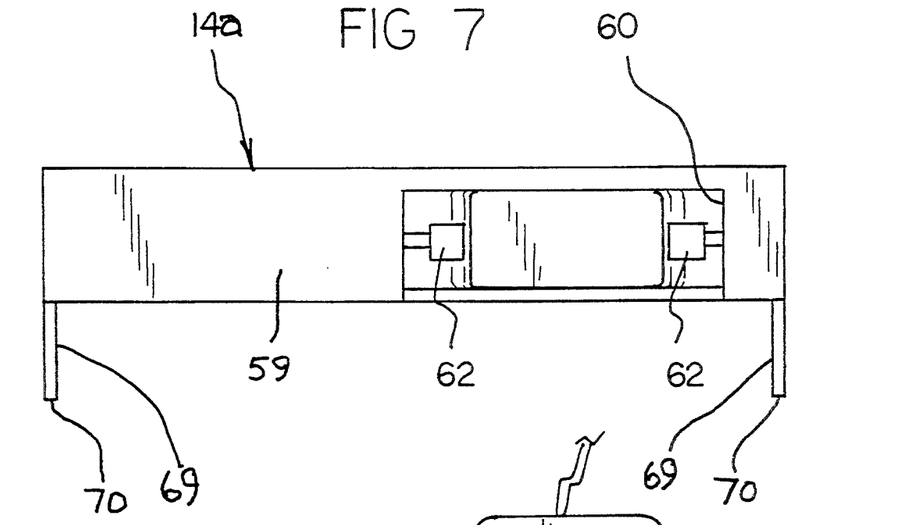
FIG. 7 is an end view of the top portion of a second embodiment of the hand scanner apparatus showing a slot and retention clips for retaining the top scanner unit in the top portion.
Figure 8:
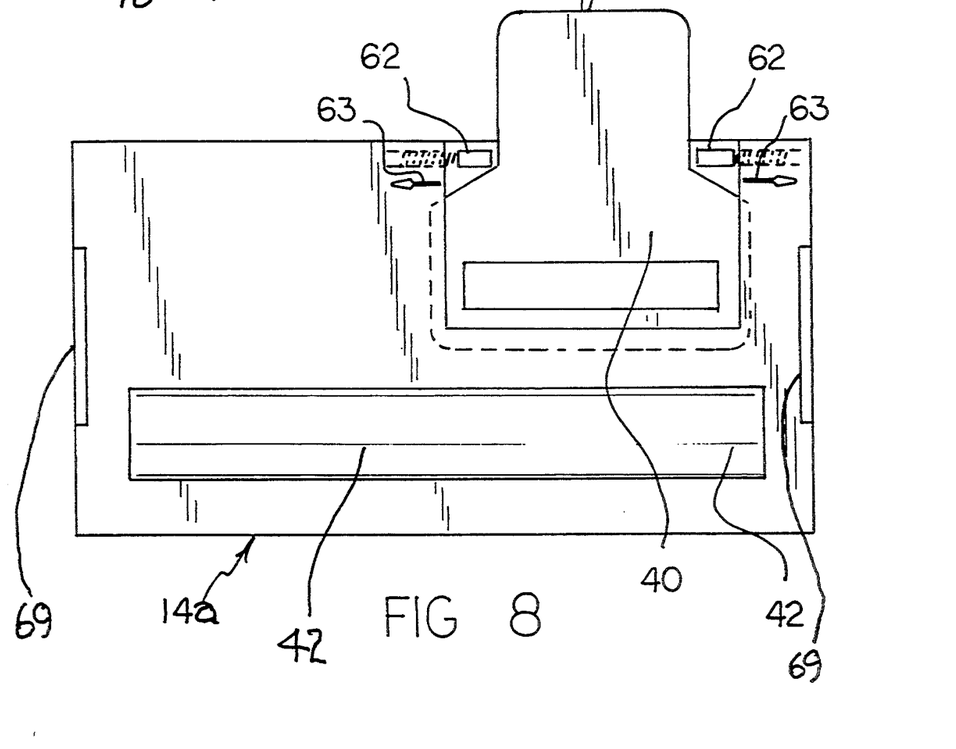
FIG. 8 is an underside view of the top portion of the embodiment shown in FIG. 7 showing the top scanner unit being retained by the retention clips.

Turning initially to FIGS. 1 through 4, there is shown a first exemplary embodiment of the improved hand scanner apparatus of the invention generally designated by reference numeral 10. In its preferred form, a hand scanner support and paper guide apparatus 10 is provided for mechanically scanning a thin sheet 11 using two scanners originally designed to be hand-held. The apparatus includes a base assembly 12, a top assembly 14, and a hinge assembly 16 connecting the base assembly 12 and the top assembly 14 together. The base assembly 12 includes a base housing 18 which includes a planar upper wall 20 or top plate which serves as a flat surface along which the thin sheet 11 (see FIG. 6 showing document 11) is moved. A base scanner support assembly 22 is supported by the base housing 18. A base scanner unit 24 is supported by the base scanner support assembly 22 a spaced distance below the planar upper wall 20 as the thin sheet 11 is moved past the base scanner unit 24. A guide assembly 26 is connected to the base housing 18 for guiding the thin sheet 11 in a straight path as the thin sheet 11 is moved along the planar upper wall 20. A drive assembly 28, a portion of which is housed within the base housing 18, is provided for moving the thin sheet 11 past the base scanner unit 24.

The drive assembly 28 includes a first driven, thin-sheet-contacting element 30 and a base slot 32 in the planar upper wall 20 for permitting the first driven, thin-sheet-contacting element 30 to contact and move the thin sheet 11 as it lies on the planar upper wall 20.

The top assembly 14 includes a top housing 34 which includes a planar lower wall 36 which serves as a flat surface below which the thin sheet 11 is moved. A top scanner support assembly 38 is supported by the top housing 34. A top scanner unit 40 is supported by the top scanner support assembly 38 a spaced distance above the planar lower wall 36 as the thin sheet 11 is moved past the top scanner unit 40.

Figure 2:
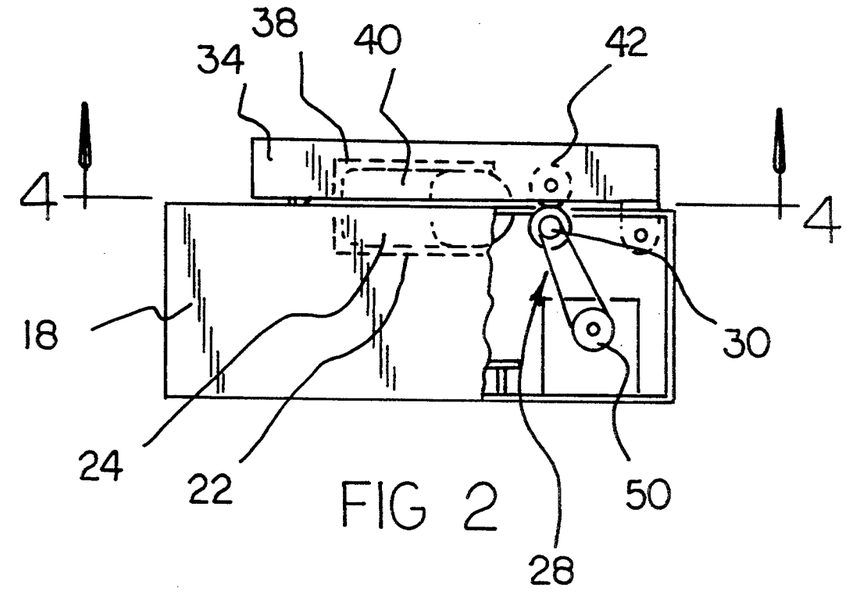
FIG. 2 is a side view of the embodiment of the hand scanner apparatus shown in FIG. 1 with the top portion in a closed position over the base portion.
Figure 3:
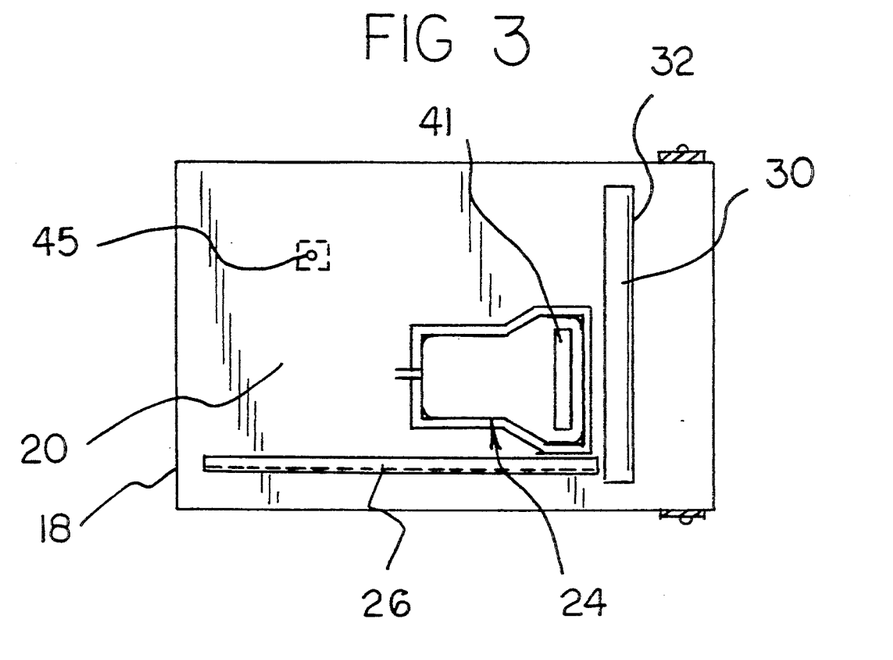
FIG. 3 is a top view of the base portion of the embodiment of the invention shown in FIG. 1 taken along line 3—3 in FIG. 1.
Figure 4:
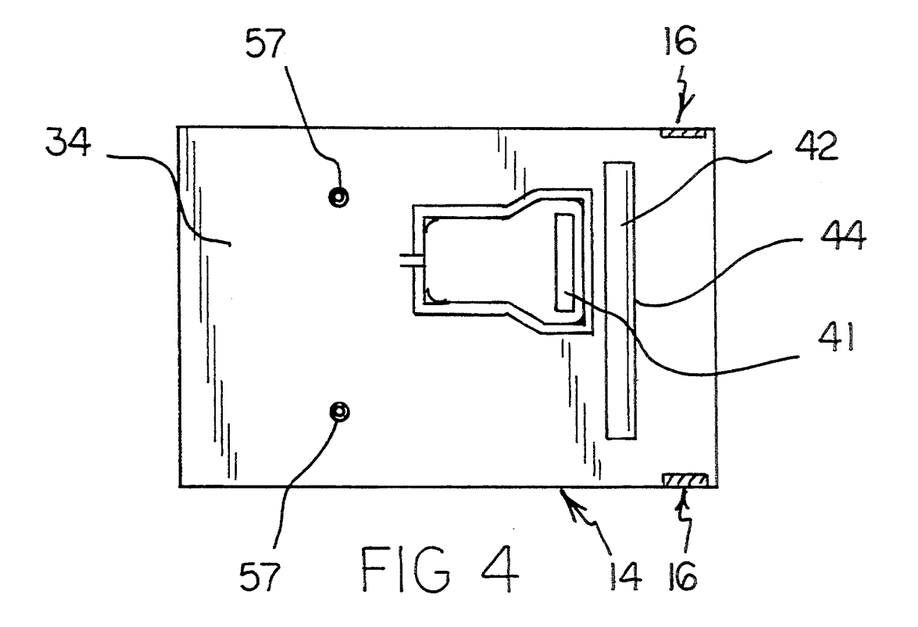
FIG. 4 is a bottom view of the top portion of the embodiment of the invention shown in FIG. 2 taken along line 4—4 in FIG. 2.

A second driven, thin-sheet-contacting element 42 is supported by the top housing 34. A top slot 44 in the planar upper wall 20 is provided for permitting the second driven, thin-sheet-contacting element 42 to contact and move the thin sheet 11 as it lies on the planar upper wall 20. The second driven, thin-sheetcontacting element 42 and the first driven, thin-sheet-contacting element 30 are positioned opposite each other. As shown in FIG. 2, the second driven, thin-sheet-contacting element 42 is driven by the thin sheet 11 as the thin sheet 11 is pinched between the first driven, thin-sheet-contacting element 30 and the second driven, thin-sheet-contacting element 42 as the thin sheet 11 is driven by the first driven, thin-sheet-contacting element 30.

Figure 1:
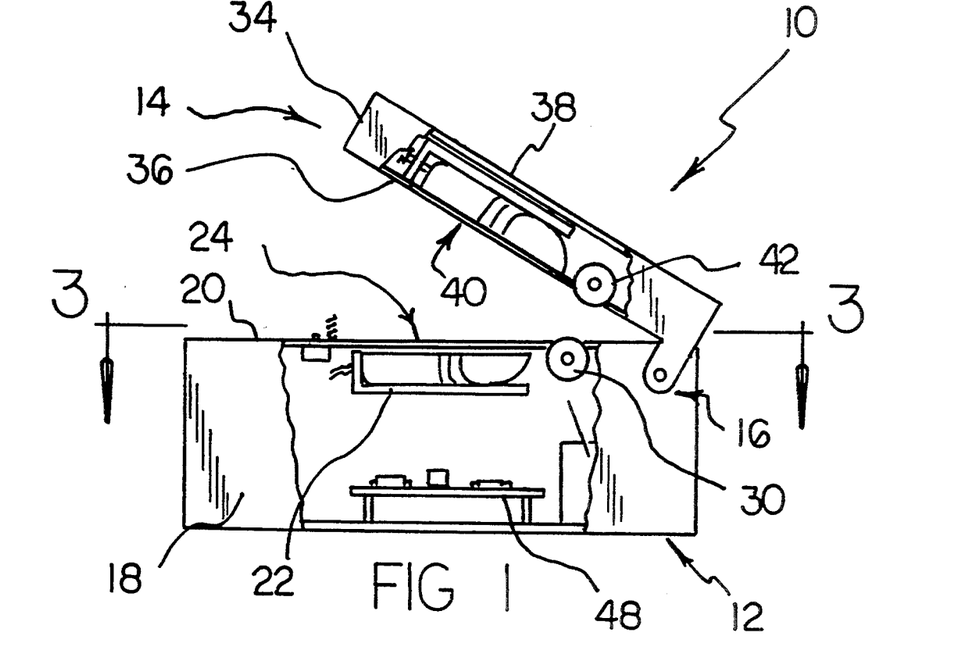
FIG. 1 is a side view showing a preferred embodiment of the hand scanner apparatus of the invention which includes a base portion and a hinged top portion with the top portion in an open position.

The top assembly 14 is adapted to rotate on the hinge assembly 16 around the base assembly 12 between two selectable positions. A closed position is provided for scanning the thin sheet 11 such that the first driven, thin-sheet-contacting element 30 and the second driven, thin-sheet-contacting element 42 are located opposite each other. An open position is provided for placing and removing the base scanner unit 24 in the base housing 18 and for placing and removing the top scanner unit 40 in the top housing 34. The top housing 34 serves to both retain the top scanner unit 40 and brace the second driven, thin-sheet-contacting element 42.

The first driven, thin-sheet-contacting element 30 is a first roller 30, and the second driven, thin-sheet-contacting element 42 is a second roller 42.

As shown in greatest detail in FIG. 6, the drive assembly 28 includes a power supply 46 for converting AC to DC power. A control and timing circuit assembly 48 is powered by the power supply 46. An activation switch assembly 45 is supported by the base housing 18 and is electrically connected to the control and timing circuit assembly 48. A drive motor 50 is electrically connected to the control and timing circuit assembly 48. The first driven, thin-sheet-contacting element 30 is mechanically driven by the drive motor 50. The second driven, thin-sheet-contacting element 42 is mechanically driven by the first driven, thin-sheet-contacting element 30 through the thin sheet 11. A paper sensor 52 is electrically connected to the control and timing circuit assembly 48. In common parlance, the first driven, thin-sheet-contacting element 30 is a drive roller 30, and the second driven, thin-sheet-contacting element 42 is a pinch roller 42.

More specifically, the power supply 46 is connected to the control and timing circuit assembly 48 by line 47. The activation switch assembly 45 is connected to the control and timing circuit assembly 48 by line 49. The drive motor 50 is connected to the control and timing circuit assembly 48 by line 51 and variable resistor 55 which serves as a speed adjustment device. More specifically, the control and timing circuit assembly 48 regulates the speed of the drive motor 50 to insure the most economical speed of the thin sheet 11 to be scanned. The drive roller 30 is mechanically driven by linkage assembly 31 driven by the drive motor 50. The linkage assembly 31 can be a shaft. The pinch roller 42 is mechanically driven by the drive roller 30 through the thin sheet 11. The paper sensor 52 is connected to the control and timing circuit assembly 48 by line 53.

In use, two hand scanner units 24 and 40 are made immobile, and the thin sheet 11 is moved past the two hand scanner units. The base scanner unit 24 scans one side of the thin sheet 11, and the top scanner unit 40 scans, such as by simultaneous scanning, the other side of the thin sheet 11. More specifically, as shown in FIG. 6, the base scanner unit 24 and the top scanner unit 40 are connected to a computer 54 through scanner control and signal lines 56. In addition, a start scan signal line 58 is connected between the control and timing circuit assembly 48 and the computer 54. A signaling circuit could be included to used the DSR signal, Carrier Detect, the CTS Signal, or the Ring indicator on a serial port to signal the computer 54 that a scan is in progress.

Figure 5:
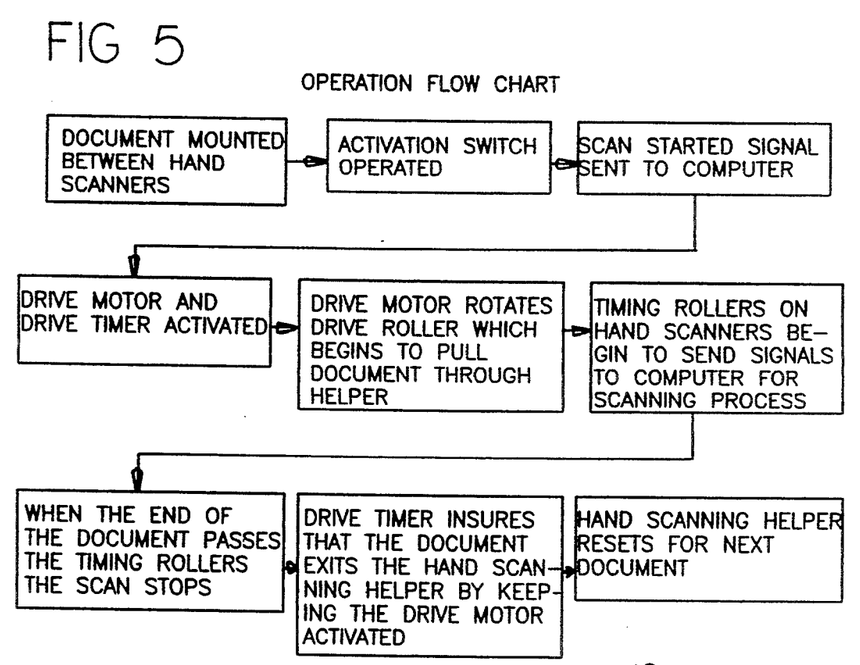
FIG. 5 is a flow chart depicting steps in the operation of the embodiment of the hand scanner apparatus shown in FIG. 1.

In operating the hand scanner apparatus 10 of the invention, reference is made to FIG. 5. More specifically, a document 11 is mounted between the base scanner unit 24 and the top scanner unit 40. The upward bias of springs 57 prevents a scan from taking place by lifting the top assembly 14 off of the base assembly 12 into a neutral position. When a person presses down upon the top assembly 14 to overcome the bias of the springs 57, then the activation switch assembly 45 is switched to an "on" position, and the scanning can begin. The control and timing circuit assembly 48 sends a scan started signal through the start scan signal line 58 to the computer 54. The control and timing circuit assembly 48 also activates the drive motor 50, and a timer portion of the control and timing circuit assembly 48 is also activated. When activated, the drive motor 50 turns the linkage assembly 31 which turns the first driven, thin-sheet-contacting element 30 which begins to move the thin sheet 11 across the base scanner unit 24 and the top scanner unit 40 by pinching the thin sheet 11 between the first driven, thin-sheet-contacting element 30 and the second driven, thin-sheet-contacting element 42.

Both the base scanner unit 24 and the top scanner unit 40 have respective timing rollers 41 which are placed in alignment and begin to send signals to the computer 54 through the scanner control and signal lines 56 in the scanning process. When the end of the thin sheet 11 moves past the just-mentioned timing rollers, the scanning process stops. The timing portion of the control and timing circuit assembly 48 assures that the thin sheet 11 exits the hand scanner apparatus 10 of the invention by keeping the drive motor 50 activated for a predetermined period of time after the end of the scanning process. Then, the control and timing circuit assembly 48 resets the timing circuitry in preparation for the next document. At this time the operator releases downward pressure on the top assembly 14, and the springs 57 return the top assembly 14 to the neutral position. A gap 39 is present at the back of the hand scanner apparatus of the invention between the top assembly 14 and the base assembly 12 when the top assembly 14 is closed on the thin sheet 11. This gap 39 allows the thin sheet 11 to exit from an end of the hand scanner apparatus as the scan takes place.

The hand scanner apparatus 10 of the invention takes hard-to-control hand operation out of the hand scanning process. With a base scanner unit 24 and a top scanner unit 40 that have a scanning width of approximately 4 inches, hand scanner apparatus 10 of the invention can be used to scan both sides of a thin sheet 11 in a 4 inch path in one pass. The hand scanner apparatus of the invention can be used in the banking industry to replace microfiche records of legal tender documents. With proper software, two passes of a document could copy both sides and match the full page. This device would provide an inexpensive alternative to a full page scanner. Because the top assembly 14 is designed to be open by the bias of the springs 57, the operator could clear possible jams easily.

The hand scanner apparatus of the invention uses existing, inexpensive hand scanners to provide an affordable alternative to expensive full page scanners. By removing the hard-to-control manually scanning step from the hand scanning process, the hand scanner device is used more accurately and reproducably. Moreover, the hand scanner apparatus of the invention does not detract from the portability of a hand scanner. Such hand scanners are relatively inexpensive and widely available commercially. An exemplary preferred hand scanner capable of being employed in the present invention with excellent results comprises the Model No. 32, sold under the SCANMAN Trademark by Logitech, Inc., Redwood City, Calif. It will be appreciated that other hand scanners may be utilized instead and that the intrinsic mechanical and electrical details per se of the particular hand scanner employed with the present invention are well known and understood and are not necessary for a complete understanding of the present invention; hence, such details will not be further described herein.

If desired a transport device can be used for transporting a thin sheet 11 across the opposing timing rollers 41 and between the first driven, thin-sheet-contacting element 30 and the second driven, thin-sheet-contacting element 42. The transport device can be comprised of a pair of transparent, flexible, and semi-stiff plastic sheets that essentially jacket the thin sheet 11 as it is passed through the first driven, thin-sheet-contacting element 30 and the second driven, thin-sheet-contacting element 42.

In accordance with a second preferred embodiment of the invention as shown in FIGS. 7 through 10, the top scanner support assembly 14a is in the form of a top scanner support bracket 59 adapted to be selectively removably snap-fitted into a fixed position relative to the base scanner assembly 12. In its preferred form top scanner support bracket 59 includes a top scanner receiving slot 60, located in one sidewall thereof, for receiving the top scanner unit 40, and retention clips 62, supported on the opposed interior sidewalls of the opening in bracket 59 defining slot 60 for removably retaining the top scanner unit 40 within the top scanner receiving slot 60. The retention clips 62 can be spring loaded and be moved in opposite directions, as shown by arrows 63, to permit suitable installation of the top scanner unit 40 in the top scanner receiving slot 60 and easy removal, if desired, for repair or replacement of the scanner unit as indicated diagrammatically in FIG. 10.

Figures 9, 10:
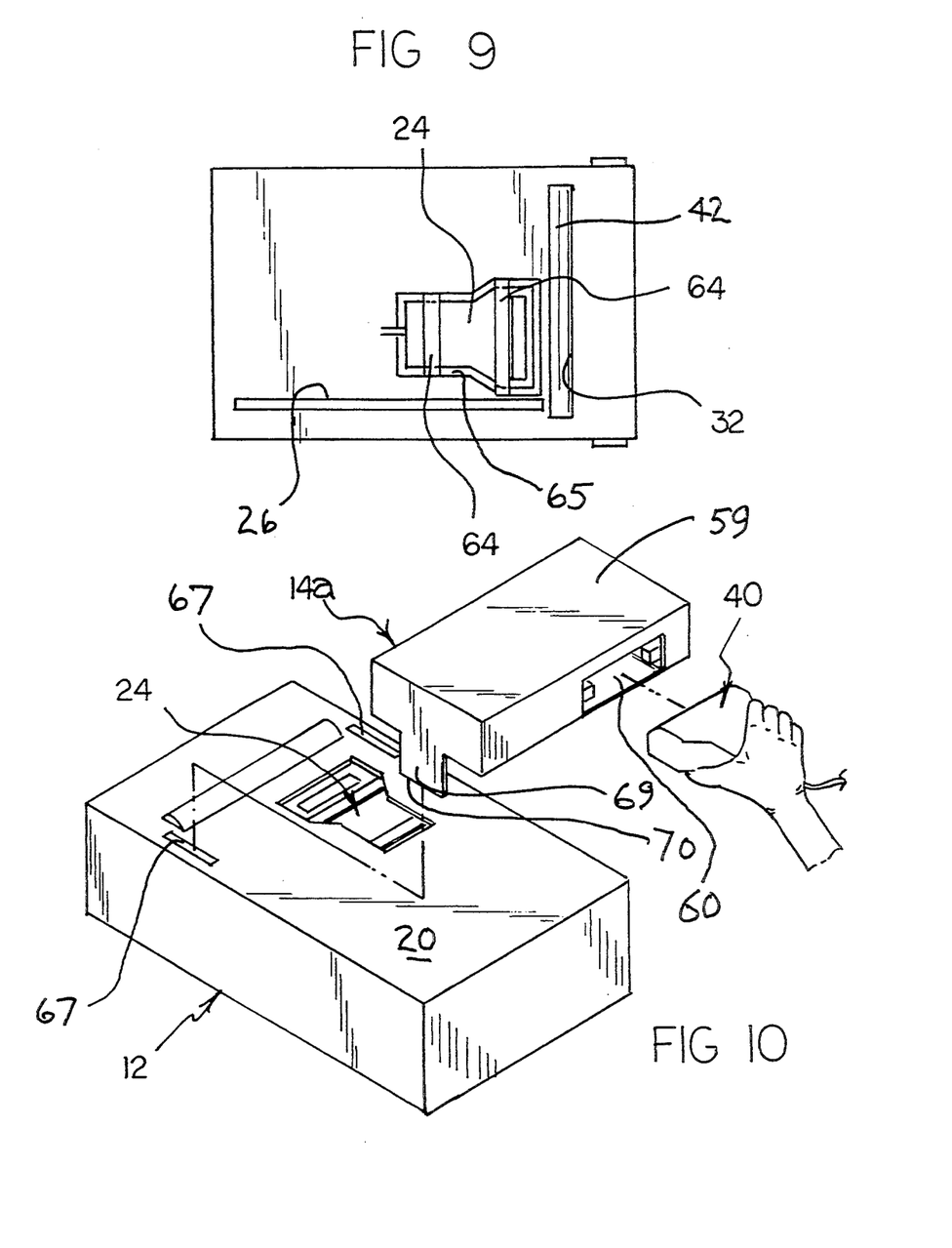
FIG. 9 is an inverted view of the base portion of the embodiment of the invention shown in FIG. 7 showing the base scanner unit retained by mounting straps.
FIG. 10 is a perspective assembly view of the second embodiment showing how the top hand scanner unit is installed in the top unit bracket and how the latter is snap-fit into engagement with the base scanner unit.

The base scanner support assembly 12 includes mounting straps 64 for securing the base scanner unit 24 to the base assembly 12 substantially as shown. Alternatively, the base scanner unit 24 may be supported in a U-shaped bracket (not shown) suitably attached to the underside of the planar upper wall top plate 20 of assembly 12 utilizing a pair of resiliently biased retention clips 62 similar to that used in connection with the top scanner assembly 14a. When mounted in place substantially as depicted the base scanner unit faces upwardly through a complementary shaped and sized opening 65 so that it may be oriented in a fixed mirror-imaged position with respect to the top scanner unit when the latter is installed in its mounting position in snap-in bracket 59 and the bracket is, in turn, snap-fitted into place on top of the base scanner assembly 12. In order to facilitate the desired "mirror imaged" registration of the top scanner unit with the bottom or base scanner unit, a pair of opposed laterally spaced slots 67 are disposed in the top plate of base unit assembly 12 for receiving therein a corresponding pair of tabs 69 extending downwardly from the opposed sidewalls of bracket 59, respectively. Each slot 67 terminates in a bottom floor or abutment to engage the distal edge surface 70 of a corresponding tab and thereby define the relative positions of the top scanner unit and the base scanner unit so as to achieve an arrangement similar to that achieved in the first embodiment when the units are in the position shown in FIG. 2, for example.

Preferably, a resilient finger may be disposed in each slot 67 (i.e. similar to retention clip 62) to engage a suitable shoulder or other engageable surface on each tab 69 when its distal surface 70 is bottomed in a corresponding slot 67 to positively retain the bracket 59 in place on the base scanner unit during operation, yet permit easy selective removal of the bracket by lifting in the upward direction when it is desired to repair or replace the top scanner unit or otherwise clean or service the device of the present invention as will occur to those of ordinary skill.

It is thus seen that in the second preferred embodiment of the present invention, the top scanner rather than being supported relative to the base or bottom scanner via a hinged lid or top, is removably supported on a bracket which, in turn, may be "snap-fitted" into its appropriate operative position on the base scanner assembly 12. In all other respects, the operation and functions of the second embodiment, both mechanically and electrically, are the same as described above with respect to the first embodiment of the invention.

The components of the hand scanner apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved hand scanner apparatus that is low in cost, relatively simple in design and operation, and which may advantageously be used to enable a two-sided sheet of paper to be scanned with hand scanner apparatus without removing, reorienting, and replacing the paper after one side has been scanned.

Thus, while the present invention has been shown in the drawings and fully descried above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as encompass all such modifications as well as all relationships equivalent to those illustrated in the drawings and described in the specification.

Finally, it will be appreciated that the purpose of the foregoing Abstract provided at the beginning of this specification is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A hand scanner support and paper guide apparatus for mechanically scanning a thin sheet using two scanner units designed to be hand-held, said apparatus comprising:
   a base assembly,
   a top assembly, and
   means for connecting said base assembly and said top assembly together,
   wherein said base assembly includes a planar upper wall which serves as a flat surface along which the thin sheet is moved, a base scanner support assembly supported by said base housing, a hand-held base scanner unit supported by said base scanner support assembly a spaced distance below said planar upper wall as the thin sheet is moved past said base scanner unit, a drive assembly, wherein said drive assembly includes a first driven, thin-sheet-contacting element and a base slot in said planar upper wall for permitting said first driven, thin-sheet-contacting element to contact and move the thin sheet as it lies on said planar upper wall,
   wherein said top assembly includes a top housing which includes a planar lower wall which serves as a flat surface below which the thin sheet is moved, a top scanner support assembly supported by said top assembly, a hand-held top scanner unit supported by said top scanner support assembly a spaced distance above said planar lower wall as the thin sheet is moved past said top scanner unit, a second driven, thin-sheet-contacting element supported by said top housing and a top slot in said planar upper wall for permitting said second driven, thin-sheet-contacting element to contact and move the thin sheet as it lies on said planar upper wall, and
   wherein said second driven, thin-sheet-contacting element and said first driven, thin-sheet-contacting element are positioned opposite each other such that said second driven, thin-sheet-contacting element is driven by the thin sheet as the thin sheet is pinched between said first driven, thin-sheet-contacting element and said second driven, thin-sheet-contacting element and as the thin sheet is driven by said first driven, thin-sheet-contacting element.

2. The apparatus of claim 1 wherein means for connecting said base assembly and said top assembly together comprises a hinge assembly.

3. The apparatus of claim 1 wherein means for connecting said base assembly and said top assembly together comprises a bracket assembly included on said top assembly and removably engageable with said base assembly.

4. The apparatus of claim 2 wherein said top assembly is adapted to rotate on said hinge assembly around said base assembly between two selectable positions, a closed position for scanning the thin sheet such that said first driven, thin-sheet-contacting element and said second driven, thin-sheet-contacting element are located opposite each other, and an open position for placing and removing said base scanner unit in said base assembly and said top scanner unit in said top assembly.

5. The apparatus of claim 1 wherein:
   said first driven, thin-sheet-contacting element is a first roller, and
   said second driven, thin-sheet-contacting element is a second roller.

6. The apparatus of claim 1 wherein said drive assembly includes:
   a power supply for converting AC to DC power,
   a control and timing circuit assembly powered by said power supply,
   an activation switch assembly supported by said base housing and electrically connected to said control and timing circuit assembly,
   a drive motor electrically connected to said control and timing circuit assembly,
   said first driven, thin-sheet-contacting element mechanically driven by said drive motor,
   said second driven, thin-sheet-contacting element mechanically driven by said first driven, thin-sheet-contacting element through the thin sheet, and
   a paper sensor electrically connected to said control and timing circuit assembly.

7. The apparatus of claim 1 wherein said top scanner support assembly includes:
   a top scanner receiving slot, in said top assembly, for receiving said top scanner unit, and
   retention clips, supported by said top assembly, for retaining said top scanner unit within said top scanner receiving slot.

8. The apparatus of claim 1 wherein said base scanner support assembly includes:
   mounting straps for securing said base scanner unit to said base assembly.

9. A hand scanner support apparatus for scanning the opposed first and second sides of a thin sheet during a single pass of the thin sheet through the support apparatus using first and second scanners designed to be hand-held, said apparatus comprising:
   a base assembly,
   a top assembly,
   said top assembly being supported relative to said base assembly,
   wherein said base assembly includes a planar upper wall which serves as a flat surface along which the thin sheet is adapted to be moved, said first hand held scanner is adapted to be supported by said base assembly a spaced distance below said planar upper wall as the thin sheet is moved past said first scanner,
   wherein said base assembly further includes an opening in said planar upper wall to enable said first scanner to scan a first side of said thin sheet as it moves along said flat surface, and
   wherein said second scanner is adapted to be supported by said top assembly a spaced distance above said planar upper wall and said opening to enable said second scanner to scan a second opposed side of said thin sheet as it moves along said flat surface.

10. The apparatus of claim 9 wherein said base assembly includes a first driven, thin-sheet-contacting element and a base slot in said planar upper wall for permitting said first driven, thin-sheet-contacting element to contact and move the thin sheet as it lies on said planar upper wall.

11. The apparatus of claim 10 wherein top assembly includes a second driven, thin-sheet-contacting element a top slot in said top assembly for permitting said second driven, thin-sheet-contacting element to contact and move the thin sheet as it lies on said planar upper wall, and wherein said second driven, thin-sheet-contacting element and said first driven, thin-sheet-contacting element are positioned opposite each other such that said second driven, thin-sheet-contacting element is driven by the thin sheet as the thin sheet is pinched between said first driven, thin-sheet-contacting element and said second driven, thin-sheet-contacting element and as the thin sheet is driven by said first driven, thin-sheet-contacting element.

* * * * *